United States Patent [19]

Cohen

[11] Patent Number: 4,519,422
[45] Date of Patent: May 28, 1985

[54] DYNAMICALLY-STOPPED AND STATICALLY-BALANCED VALVE

[75] Inventor: Kenneth W. Cohen, Westwood, N.J.

[73] Assignee: Aerco International, Inc., Northvale, N.J.

[21] Appl. No.: 531,925

[22] Filed: Sep. 13, 1983

[51] Int. Cl.³ .......................................... F16K 31/128
[52] U.S. Cl. ................................ 137/630.14; 91/394; 251/35; 251/45
[58] Field of Search ................. 137/630.14, 630.15; 251/35, 45, 46; 91/394, 404

[56] References Cited

U.S. PATENT DOCUMENTS

| | | | |
|---|---|---|---|
| 1,176,535 | 3/1916 | Fulton | 251/45 |
| 2,200,226 | 5/1940 | Larson | 137/630.14 |
| 2,291,101 | 7/1939 | Papulski . | |
| 2,332,630 | 10/1943 | Fawkes . | |
| 2,508,010 | 5/1950 | Bower . | |
| 2,542,167 | 2/1951 | Teague, Jr. . | |
| 2,590,853 | 4/1952 | Fulton . | |
| 2,718,898 | 9/1955 | Cotton | 137/630.14 X |
| 2,725,749 | 12/1955 | Green . | |
| 2,926,882 | 3/1960 | Russell | 251/35 X |
| 3,134,400 | 5/1964 | Schifter . | |
| 3,232,310 | 2/1966 | Treder . | |
| 3,236,258 | 2/1966 | Teston . | |
| 3,415,269 | 12/1968 | Salerno | 251/35 |
| 3,493,008 | 2/1970 | Scaglione . | |
| 3,638,670 | 2/1972 | Allen . | |
| 3,953,984 | 5/1976 | Widdowson . | |
| 4,032,252 | 6/1977 | Ceresa . | |

Primary Examiner—Robert G. Nilson
Attorney, Agent, or Firm—Brumbaugh, Graves, Donohue & Raymond

[57] ABSTRACT

A self-contained, pilot-operated valve is provided with a plug for controlling the flow of a fluid through an orifice between inlet and outlet openings. A spring located about a stem projecting from the plug urges the plug into sealing engagement with the orifice. By means of a bellows surrounding the spring and having one end connected to the stem, an interior space is created, which space is in communication with the inlet opening through a restricted conduit. The interior space is also in communication with the outlet opening via a pilot valve. Operation of the pilot valve controls the pressure in the interior bellows space and hence the degree to which the bellows is compressed. This compression affects the plug stem and hence the position of the plug with respect to the valve seat. In order to prevent an overpressure on the bellows when the valve is open, a valve operator closes off the communication between the interior space of the bellows and the outlet opening, thereby allowing the pressure on the inside of the bellows to build up to prevent a collapse of the bellows.

7 Claims, 1 Drawing Figure

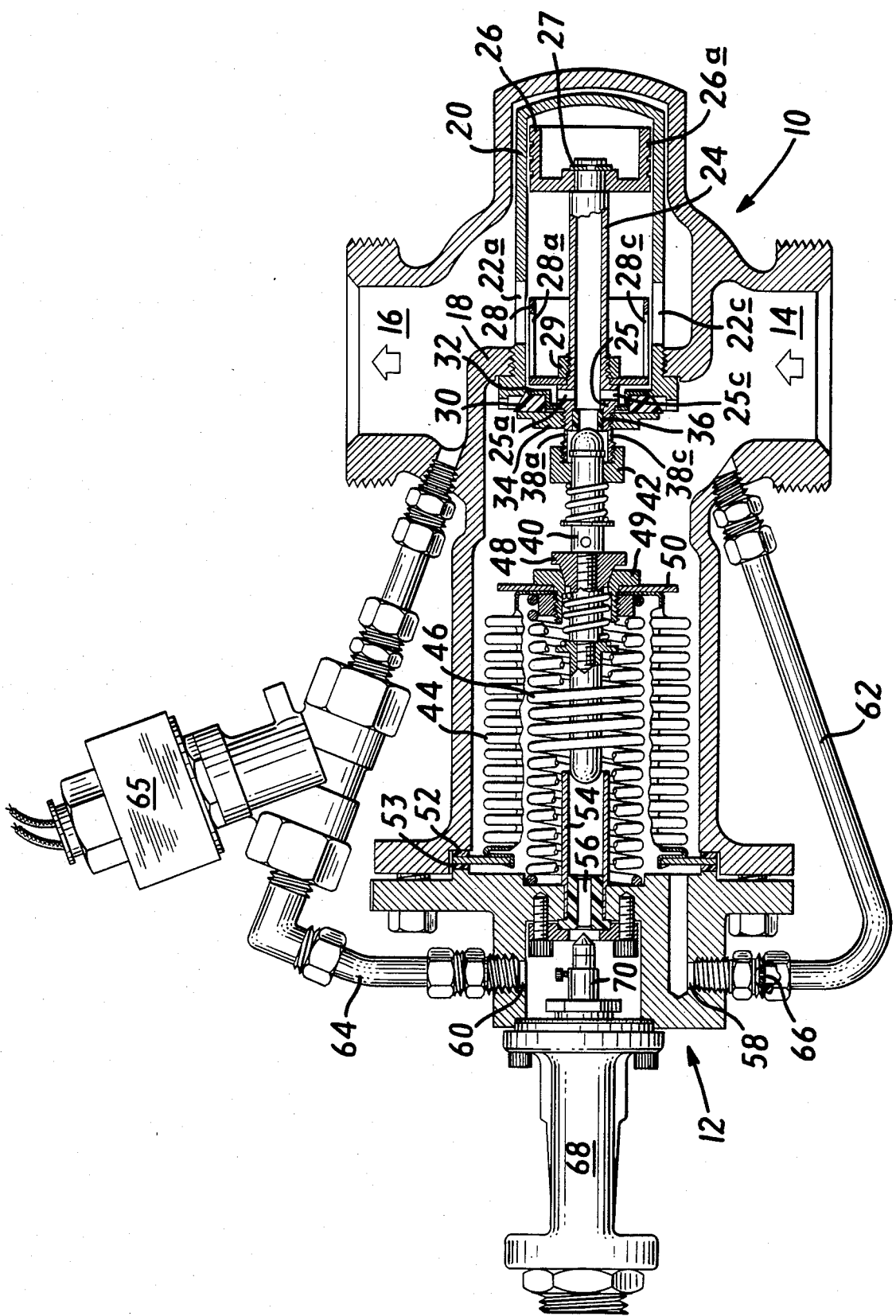

DYNAMICALLY-STOPPED AND STATICALLY-BALANCED VALVE

BACKGROUND OF THE INVENTION

This invention relates to self-contained valves and, more particularly, to self-contained, dynamically-stopped and statically balanced valves.

A valve that passes steam, water or some other fluid medium and uses that same medium to generate most of the force necessary to operate the valve is known as a self-contained or pilot-operated valve. For example, as shown in the Fulton U.S. Pat. No. 1,176,535, a control fluid enters an inlet opening, moves through a valve seat opening and then exits via an outlet opening. A spring positioned about a valve plug stem urges a valve plug into a valve seat. Located about the valve stem is a metal bellows attached by a plate to the valve stem.

Provision is made to permit the fluid from the inlet opening to enter the bellows and support the closing force of the spring. By means of a pilot valve, the pressure within the bellows can be reduced rapidly. As a result, the pressure outside the bellows exceeds the pressure within the bellows and the bellows begins to collapse. This has the effect of overcoming the spring and lifting the valve plug from its seat. A complete collapse of the bellows in its axial direction is prevented by means of a mechanical stop.

When the valve is to be closed, the pilot valve is operated to close the relief line from the interior of the bellows. The pressure within the bellows then begins to increase until it matches the pressure outside the bellows. When this occurs, the spring can then return the valve plug to its seat, closing off the flow of fluid.

Other patents disclosing self-contained or pilot-operated valves include the Papulski U.S. Pat. No. 2,291,101, the Fulton U.S. Pat. No. 2,590,853 and the Scaglione U.S. Pat. No. 3,493,008.

A standard technique in the design of self-contained valves is the use of a balancing piston to reduce the force necessary to lift the valve plug away from its seat. The use of such a balancing piston is generally effective to balance out the forces over most of the stroke provided that a small sealing annulus is used. A drawback with such arrangements is that imbalance forces are created as the valve plug leaves its seat. These forces make controlling the valve at the opening area extremely difficult, especially when soft-seated valves are employed. One way of dealing with this problem is to use a high rate spring, with a resulting large control area.

SUMMARY OF THE INVENTION

The present invention is directed to eliminating the imbalance forces at the sealing annulus of a valve and permitting the valve to be lifted away from its valve seat without any changes in force.

In an illustrative embodiment of the present invention, a dynamically-stopped and statically balanced valve includes an inlet opening and an outlet opening in fluid communication with each other through an orifice. A movable valve plug is provided for sealing off the orifice when it is in a closed position, and allowing full communication between the inlet and outlet openings when in an open position. Extending from the plug is a stem which has limited axial movement toward and away from the plug. This movement permits an equalization of forces at the valve plug before the plug is moved away from the orifice. Accordingly, no imbalance exists across the valve and the valve may be lifted smoothly away from the orifice. Connected to the valve stem is a bellows whose interior is connected via a constricted opening to the inlet opening. A servo spring is mounted within the bellows and, through the valve stem, urges the valve plug into sealing engagement with the orifice.

The interior of the bellows is also connected to the outlet opening through an external pilot valve. The pilot valve controls the flow of fluid out of the interior of the bellows. By closing the pilot valve, pressure inside the bellows builds up as fluid flows into the bellows through the constricted opening. This pressure allows the spring to urge the plug into the orifice by balancing the pressure outside and inside the bellows.

When the pilot valve is opened, the pressure in the bellows decreases. Under pressure from the fluid supplied from the inlet opening, the bellows and its associated spring will be compressed. This causes the plug to lift away from the orifice and connect the inlet and outlet openings. A total collapse of the bellows is prevented, however, because at a predetermined point, a valve operator on the valve stem closes the opening in the pilot valve to permit pressure to begin to build up in the bellows. This trapped fluid dynamically balances the pressure on the outside of the bellows. With this dynamic balancing, the bellows can be small in size and can be made of a relatively light metal.

BRIEF DESCRIPTION OF THE DRAWING

The foregoing and other features of the present invention will be more readily apparent from the following detailed description and drawing of an illustrative embodiment of the invention, the sole FIGURE of the drawing being a sectional view of the invention.

DETAILED DESCRIPTION OF THE PREFERRED EMBODIMENT

In the embodiment of a dynamically-stopped and statically balanced valve arranged according to the present invention shown in the drawing, the flow of fluid, e.g. steam or water, through the valve is controlled with a reduced operating force. The valve includes an open-ended valve housing 10 which is bolted at its open end to a pilot valve housing 12. The housing 10 includes an inlet port 14 and an outlet port 16, both of which are shaped and externally threaded for coupling to a pair of pipes through appropriate fittings.

The housing 10 is formed with a generally ring-shaped interior wall 18 that forms a barrier between the inlet and outlet openings 14 and 16. The wall 18 is threaded at its opening to receive a generally cylindrically shaped cage 20 that extends lengthwise within the housing 10 and across the outlet opening 16. Four equally spaced holes 22a–22d are formed in the cage 20 and open the interior of the cage 20 to the interior of the housing 10 and to the outlet port 16.

A hollow, double open-ended shaft 24 with an enlarged end 25 is mounted for axial movement within the cage 20 and the housing 10. It carries at one end a first piston 26 which is open at one end and includes circumferential grooves 26a which form labyrinthal seals in its exterior wall. A retaining ring 27 holds the piston 26 in place on the shaft 24. Mounted near the enlarged end of the shaft 24 is a hollow and also open-ended second piston 28. The piston 28 is held in place by a nut 29 that threadedly engages the shaft 24 and forces the closed end of the second piston into engagement with the enlarged end 25 of the shaft 24. The second piston 28 includes four equally spaced circular holes 28a–28d which permit the flow of fluid to and through the openings 22a–22d formed in the cage 20.

The enlarged end 25 of the shaft 24 is formed with radial openings 25a–25d which form fluid flow paths between the interior of the shaft 24 and the interior of the cage 20. Adjacent the openings 25a–25d is mounted a valve plug which consists of a ring-like disc seat 30 formed of a resilient material such as Teflon secured between a retaining ring 32 and a retaining disc 34. There is mounted within the enlarged end an internal pilot seat 36 which is also formed of a resilient material, such as Teflon. Four spaced holes 38a–38d open the interior of the housing 10 in the interior of the shaft 24.

A spring-biased valve stem 40 is mounted for limited axial movement within a nut 42 that is threaded onto the open end of the shaft 24. In the position as shown, the valve stem 40 engages the valve seat 36 to prevent any fluid from reaching the interior of the shaft 24. When, however, the stem 40 is lifted from the seat, fluid will enter the shaft 24 through the seat before the valve plug is lifted away from the cage 20.

The valve stem 40 is secured to a bellows 44 and a servo spring 46 through a pair of outer and inner nuts 48 and 49, respectively, and a bellows support plate 50. A pair of gaskets 52 and 53 hold the bellows in place within the housing.

The pilot valve housing 12 includes an opening formed in the middle thereof which is aligned with the valve stem 40. A metal cylinder 54 is secured within the opening of a housing 12 and extends into the housing 10 to form a guide for the valve stem 40 and also to minimize the carryover of estrained water in steam applications. Fitted within cylinder 54 is a ring-like upper pilot seat 56 also formed of resilient material such as Teflon. It is through the seat 56 that fluid is free to flow between the interior of the bellows 44 and the interior of the housing 12.

The pilot valve housing 12 includes a pair of openings 58 and 60; the first of which is adapted to communicate directly with the inlet port 14 of the housing 10 through a tube 62, and the second of which communicates directly with the outlet port 16 of the housing 10 through a tube 64. The fittings shown in the drawing which couple the tubes 62 and 64 to the housings 10 and 12 are conventional and, accordingly, are neither given numbers nor described herein. As an optional feature, a steam solenoid valve 65 may be attached to the tube 64 as a safety feature.

In the tube 62 near the opening 58 in housing 12 there is mounted a metal washer 66 formed with a constricted opening or gain orifice through which the fluid in tube 62 passes. The constricted opening limits the rate at which inlet fluid passes from the tube 62 into the interior however, fluid supplied to the interior of the bellows 44.

Screw mounted to the pilot valve housing 12 is a temperature regulator pilot assembly 68 which carries a stem 70 at its one end. The stem 70 will be driven axially into and out of engagement with the pilot seat 56 by the regulator 68. Typically, this will occur automatically as a result of temperature changes measured by a thermal element (not shown) connected to the temperature regulator pilot assembly 68.

The relationship between the components of the illustrated valve and the uniqueness of the present invention should be made clear from the following description of operation. When the temperature regulator assembly 68 is unenergized, the assembly causes the external pilot stem 70 to engage the upper pilot seat 56. This has the effect of closing off an escape path for the fluid within the bellows. That is, when the stem 70 is retracted from the pilot seat 56, fluid within the bellows is free to escape through the sleeve 54, the pilot seat 56, the interior of the pilot valve housing 12 and the tube 64 to the outlet port 16 of the housing 10. With the pilot valve closed, however, fluid supplied to the interior of the bellows 44 through the restricted opening in tube 62 from the inlet port 14 of the housing 10 is retained within the bellows and pressure therein will begin to increase.

The fluid pressure within the bellows balances the pressure within and without the bellows so that the pressure exerted by the servo spring 46 drives the valve plug against the cage 20. In this configuration (as shown) the valve stem 40 engages the pilot seat 36 to close off any communication between the interior of the housing 10 and the interior of shaft 24 and the disc seat 30 engages the bottom wall of the seat cage 20 to close off any fluid flow path between the inlet and outlet ports 14 and 16.

When the temperature regulator assembly 68 is energized and retracts stem 70 from seat 56 (as shown), a flow path is opened from the interior of the bellows 44 to the tube 64. This causes a reduction in the pressure within the bellows 44 which cannot be made up by the inflow of fluid from the tube 62 because of the constricted opening formed in the washer 66.

With a loss of pressure in the bellows, the fluid pressure in the housing 10 overcomes the compression force of the servo spring 46 and the bellows will begin to collapse. At first, the valve stem 40 will be removed from the valve seat 36. The removal of stem 40 from the seat 36 opens a fluid flow path between the interior of the housing 10 and the interior of the valve shaft 24. The shaft thus carries fluid into the cage 20 through the radial openings 25a–25d and to its open end where the fluid is discharged under the piston 26. As a result, fluid pressure builds under the piston 26 and on top of the piston 28.

The limited axial movement of the stem 40 away from the pilot seat 36 at the beginning of the stroke is an important feature of the present invention. This permits an equalization of forces at the valve plug before the plug is moved from the seat cage and fluid communication is established between the inlet and outlet openings of the housing 10. More particularly, the pistons 26 and 28 have equal areas. Thus, at the beginning of the stroke, the forces created due to the fluid pressure acting under the piston 26 and on top of the piston 28 are balanced exactly.

Moreover, it will be appreciated that, without the present arrangement, an imbalance force would be created across the "soft" valve seat 30. Such imbalance force would be the product of the differential area of the valve seat multiplied by the change in pressure across the valve seat. However, with the applicant's invention, before the valve is lifted away from its seat, the inlet fluid that acts against the piston 28 also acts against the valve seat 30. This reduces the pressure differential across the valve seat to zero. Since the imbalance force is the product of area times the difference in pressure across the valve, the imbalance force is reduced to zero. Thus, the valve is perfectly balanced and is lifted smoothly away from its seat.

The valve stem 40 eventually reaches the limit of its axial movement with respect to the nut 42. At this point, the disc seat 30 is lifted out of engagement with the seat cage 20. As the bellows 44 continues to collapse, thus, a flow path is created from the inlet port 14 to the outlet port 16 through the openings 28a–28d formed in the piston 28 and the openings 22a–22d formed in the seat cage 20.

A unique aspect of the present valve is the extension of the valve stem 40 into the cylindrical tube 54 and its movement with the bellows 44. At maximum stroke, the stem 42 will close off the flow of fluid through the opening formed in the seat 56. Thus, the fluid flowing through the constricted opening in the washer 66 and into the interior of the bellows 44 will become trapped, increasing the pressure in the bellows to a pressure consistent with maintaining the bellows compression at that length. Thus, no matter what the pressure drop is across the valve, the pressure drop across the bellows cannot exceed that which is necessary to compress it to the point where the stem 40 closes off the pilot bleed port in the seat 56. This is a controlled value determined by the servo spring 46 and bellows area and is small compared to the maximum pressure in the valve.

The use of stem 40 establishes a dynamic stop because the bleed port in the seat 56 is closed off at an operating point where the forces within the bellows trying to open it are equal to the forces trying to close it. In particular, the stem moves to a position to maintain the force in balance and stays in that position until the overpressure conditions are relieved.

One advantage of the use of a dynamic stop, as opposed to a mechanical stop, is that the bellows only needs to be designed to withstand a small pressure and not the entire valve supply pressure. Thus, for a given stroke, it can be made of a material that is quite small and thin. However, it still has an excellent stroke potential and longevity.

While the invention has been particularly shown and described with reference to a preferred embodiment thereof, it will be understood by those skilled in the art that various changes in form and details may be made therein without departing from the spirit and scope of the invention.

I claim:

1. A dynamically-stopped and statically-balanced valve comprising:
    a valve structure defining an inlet opening and an outlet opening in fluid communication with each other through an orifice;
    a movable main valve plug for sealing said orifice when in a closed position and allowing full communication between said inlet and outlet openings when in an open position;
    a first pilot valve for permitting the flow of fluid from one side of the main valve plug to the other, said valve formed by an opening formed in the main valve plug through which inlet fluid passes to equalize the fluid pressure across the main valve plug and permit the valve plug to be lifted smoothly away from said orifice and a spring-biased valve plug stem attached to the main valve plug and having one end that is movable into and out of engagement with said opening;
    a bellows having one end attached to the valve structure and the other end attached to the valve plug stem so as to define an interior bellows space and an exterior bellows space communicating with the inlet opening;
    a spring mounted within the valve structure so as to urge said valve plug into sealing engagement with said orifice and the one end of the valve plug stem into engagement with the opening formed in the main plug;
    first conduit means for conducting fluid from said inlet opening to the interior bellows space;
    second conduit means for conducting fluid from the interior bellows space to the outlet opening; and
    a second pilot valve controlling the flow of fluid in said second conduit means on command, wherein the other end of the valve plug stem functions to close off the second conduit when the valve plug is in the open position, whereby pressure in the interior bellows space is maintained at a level whereby the total collapse of the bellows is prevented.

2. A valve as claimed in claim 1, further including means for coupling the spring-biased valve plug stem to the main valve plug, said means arranged to permit the plug stem to move axially away from the opening in the main valve plug for a distance sufficient to permit the flow of fluid from the inlet opening through the opening in the main valve plug to equalize the fluid pressure across the main valve plug before the continued movement of the plug stem causes the main valve plug to move into an open position.

3. A valve as claimed in claim 2, wherein said first conduit means includes a flow restriction therein.

4. A valve as claimed in claim 3, wherein the orifice is provided in a hollow seat cage extending between said inlet and outlet openings, said main valve plug being movable into sealing engagement with a valve seat formed in said seat cage, openings in said seat cage providing communication between its interior and said outlet opening.

5. A valve as claimed in claims 1 or 4, wherein said main valve plug has a piston rod with a balancing piston located on the side of the plug directed toward said outlet opening, a passageway being formed from said inlet opening through the opening in said plug, the piston rod and the balancing piston to a lower face of said balancing piston, said valve plug stem connected to the main valve plug and having a main plug operator attached to its end, said connection being such that the valve plug stem is capable of limited axial movement relative to the plug between a first position, in which it closes the passageway in the plug and forces the plug into sealing engagement with the orifice, and a second position in which it opens the passageway and raises the plug away from the orifice.

6. A valve as claimed in claim 1, wherein said second conduit comprises a first fluid channel having one end that is closed by said valve plug stem when the valve is open and having its other end closed by said second pilot valve upon operation of said pilot valve.

7. A valve as claimed in claim 6, wherein said second conduit further comprises a second fluid channel extending from an outlet of said second pilot valve to the vicinity of the outlet opening.

* * * * *